(12) United States Patent
Gibson

(10) Patent No.: US 10,605,387 B2
(45) Date of Patent: Mar. 31, 2020

(54) MULTIPLE LAYER HARDNESS FERRULE AND METHOD

(71) Applicant: Parker-Hannifin Corporation, Cleveland, OH (US)

(72) Inventor: James David Gibson, Huntsville, AL (US)

(73) Assignee: Parker-Hannifin Corporation, Cleveland, OH (US)

( * ) Notice: Subject to any disclaimer, the term of this patent is extended or adjusted under 35 U.S.C. 154(b) by 218 days.

(21) Appl. No.: 15/618,940

(22) Filed: Jun. 9, 2017

(65) Prior Publication Data

US 2017/0276271 A1    Sep. 28, 2017

Related U.S. Application Data

(63) Continuation of application No. PCT/US2015/064958, filed on Dec. 10, 2015, which is a continuation-in-part of application No. 14/565,995, filed on Dec. 10, 2014, now abandoned.

(60) Provisional application No. 61/914,066, filed on Dec. 10, 2013.

(51) Int. Cl.
```
F16L 19/10    (2006.01)
C23C 8/04     (2006.01)
C23C 8/26     (2006.01)
C23C 8/80     (2006.01)
```

(52) U.S. Cl.
CPC .............. *F16L 19/103* (2013.01); *C23C 8/04* (2013.01); *C23C 8/26* (2013.01); *C23C 8/80* (2013.01); *F16L 19/10* (2013.01); *Y10T 16/39* (2015.01)

(58) Field of Classification Search
CPC . F16L 19/103; C23C 8/04; C23C 8/06; C23C 8/24; C23C 8/26; C23C 8/28; C23C 8/34; C23C 8/50; C23C 8/80; Y10T 16/39; Y10T 16/42
USPC ............ 16/108, 109; 148/212; 285/341, 342, 285/382.7
See application file for complete search history.

(56) References Cited

U.S. PATENT DOCUMENTS

| 5,308,707 A * | 5/1994 | Cellier | ................... C23C 8/80 148/206 |
| 5,851,313 A * | 12/1998 | Milam | ................... C23C 8/38 148/222 |
| 6,093,303 A * | 7/2000 | Williams | ................ C23C 8/02 148/206 |

(Continued)

FOREIGN PATENT DOCUMENTS

| CN | 101078453 A | * 11/2007 |
| CN | 201053545 Y | * 4/2008 |

(Continued)

OTHER PUBLICATIONS

U.S. Appl. No. 14/565,995, filed Dec. 10, 2014.

(Continued)

*Primary Examiner* — William L Miller
(74) *Attorney, Agent, or Firm* — Renner, Otto, Boisselle & Sklar, LLP

(57) ABSTRACT

A ferrule and associated method characterized by an outer layer having a hardness; an intermediate layer below the outer layer, the intermediate layer having a hardness that is less than the hardness of the outer layer; and a core below the intermediate layer, the core having a hardness that is less than the hardness of the intermediate portion.

19 Claims, 7 Drawing Sheets

(56) References Cited

U.S. PATENT DOCUMENTS

| | | | |
|---|---|---|---|
| 6,165,597 A * | 12/2000 | Williams | C23C 8/04 |
| | | | 148/213 |
| 6,530,998 B1 | 3/2003 | Oofune | |
| 7,497,483 B2 | 3/2009 | Williams et al. | |
| 7,695,027 B2 | 4/2010 | Williams et al. | |
| 7,784,837 B2 | 8/2010 | Williams et al. | |
| 8,845,823 B2 | 9/2014 | Christiansen et al. | |
| 9,574,248 B2 * | 2/2017 | Christiansen | C23C 8/02 |
| 2004/0212192 A1 | 10/2004 | Williams | |
| 2012/0111456 A1 | 5/2012 | Christiansen et al. | |
| 2014/0048180 A1 | 2/2014 | Christiansen et al. | |
| 2015/0107719 A1 | 4/2015 | Jung et al. | |
| 2015/0107720 A1 | 4/2015 | Noh et al. | |
| 2015/0107723 A1 | 4/2015 | Noh et al. | |
| 2015/0160416 A1 | 6/2015 | Gibson | |
| 2015/0176113 A1 | 6/2015 | Noh et al. | |
| 2016/0146383 A1 * | 5/2016 | Gibson | F16L 19/10 |
| | | | 285/382.4 |

FOREIGN PATENT DOCUMENTS

| | | |
|---|---|---|
| EP | 1 119 649 A2 | 8/2001 |
| EP | 2 278 038 A1 | 7/2009 |
| FR | 818 587 A | 9/1937 |
| KR | 2010 0039648 A | 4/2010 |
| KR | 101 429 456 B1 | 8/2014 |
| WO | 2000/09773 | 2/2000 |
| WO | 2000/09776 A1 | 2/2000 |
| WO | 2011/009463 A1 | 1/2011 |
| WO | 2012/146254 A1 | 11/2012 |
| WO | 2013/159781 A1 | 10/2013 |
| WO | 2015/060551 A1 | 4/2015 |

OTHER PUBLICATIONS

International Search Report and Written Opinion for corresponding Patent Application No. PCT/US2015/064958 dated Mar. 14, 2016.

* cited by examiner

MULTIPLE LAYER HARDNESS FERRULE AND METHOD

RELATED APPLICATION

This application is a continuation of International Application No. PCT/US2015/064958 filed Dec. 10, 2015 and published in the English language, which is a continuation-in-part of U.S. Nonprovisional patent application Ser. No. 14/565,995 filed Dec. 10, 2014, this application is also a continuation-in-part of U.S. Nonprovisional patent application Ser. No. 14/565,995 filed Dec. 10, 2014, which claims priority of U.S. Provisional Application No. 61/914,066 filed Dec. 10, 2013, which are hereby incorporated herein by reference.

TECHNICAL FIELD

The present invention relates generally to tube fittings, and more particularly to fittings of the ferruled variety.

BACKGROUND

Stainless-steel compression tube fittings make it easy to install and maintain measurement and control instruments used in chemical processing, petrochemical plants, paper mills, and many other industrial settings. They can be used to seal a broad range of aggressive fluids and chemicals, and resist internal and external corrosion. The fittings grip and seal by compressing the nose of a ferrule into the outer diameter surface of the tubing. High-quality compression fittings hold internal pressure without leaks or failure until the tubing fails. And users can often repeatedly disassemble and reassemble them with no loss of sealing integrity.

The ferrule may appear rather simple, but actually highly engineered and, to function properly, usually requires considerable design, metallurgy, and production expertise. Not all products on the market meet these stringent requirements. For instance, the ferrule should properly deform elastically and plastically during fitting assembly to properly grip and seal the tubing. Its front edge usually must be harder than the tubing to grip and seal through surface scratches and defects, but if the entire ferrule is too hard, it may not deform properly. Therefore, only the gripping edge of the ferrule may be hardened while the rest may have different, tightly controlled mechanical properties. Also, the hardening process should not compromise stainless steel's corrosion resistance. And finally, production processes should consistently turn out defect-free ferrules that hold tight tolerances and maintain metallurgical specifications.

Ferrules have been machined from cold-drawn stainless-steel bar stock. Cold drawing strain hardens the metal and imparts mechanical strength throughout the ferrule. But the ferrule's front edge was often still not hard enough to seal against tube surface defects such as scratches, weld seams, ovality, and hardness variations, whereas the core hardness was too high to deform properly.

Conventional gas nitriding can be used to case harden the outer surface of the ferrule to a depth of approximately 0.004 in. During assembly, the ferrule front edge shears into the tube. If disassembled, the ferrule remains tightly locked to the tubing, allowing remakes with consistent sealing integrity. However, gas nitriding (as well as carburization and carbonitriding) substantially lowers stainless steel's corrosion Conventional nitriding and carburizing require high temperatures for the hardening constituents, nitrogen and carbon, to penetrate the passive oxide layer that makes stainless steel corrosion resistant. The high temperatures permit chromium, an anticorrosion alloying element, to diffuse through the metal and form chemically stable nitrides and carbides. These compounds give the surface layer most of its hardness, but in this chemically combined form chromium no longer resists corrosion, and the nitrided or carburized layer corrodes in many environments, including seawater and even moist air.

In addition, nitriding and carburizing can "sensitize" austenitic stainless steel exposed to high temperatures for an extended time. Carbon, which has low solubility in stainless steel, precipitates as chromium carbides in the grain boundaries, depleting regions adjacent to the grain boundaries of the chromium necessary for corrosion resistance. This process is known as sensitization.

Also known are hardening processes that do not reduce the corrosion resistance of stainless steel. These processes create a very hard (generally greater than 60 HRc) but very thin (generally 0.001-0.002 inches or less) ferrule outer skin. The skin allows for consistency in the penetration of a tube's outer surface by the ferrule, which can result in improved sealing and holding. These other processes do not require the high temperatures and long durations that permit chromium diffusion. This keeps chromium in solid solution as a corrosion-resistant alloying element. The hardened layer is continuous, free of defects and voids, as the process tends to fill surface inclusions and substantially reduce end-grain corrosion effects. One such process is the Suparcase® process performed by Parker-Hannifin Corporation.

These other processes also do not affect the bulk metal. There is no sensitization or change in mechanical strength beneath the hardened layer. The ductile layer deforms with the ferrule during assembly without cracking or spalling. In these processes, carbon and/or nitrogen supersaturates the hardened layer. Carbon/nitrogen atoms occupy interstitial sites in austenitic stainless steel's face-centered, cubic crystal lattice, strengthening the hardened layer. The hard crystal-lattice structure would like to expand to accommodate these atoms, but is constrained by the unhardened substrate. As a consequence, high compressive stress further enhances hardness. Compressive stress has the added benefits of substantially increasing a ferrule's fatigue and stress-corrosion resistance. In general terms, the process removes the passive oxide layer from the steel surface, letting carbon/nitrogen atoms diffuse directly into the metal lattice without traversing the passive layer barrier. These atoms diffuse at lower temperatures than other alloying elements, thus avoiding problems caused by formation of carbides and nitrides.

Mechanical properties of the ferrule should also be taken into account. An extremely hard ferrule may be too stiff during assembly and may not bow and properly grip the tubing. But if it is too soft, the underlying material may not support the case-hardened surface. The result can be an eggshell effect: the gripping front edge collapses during assembly and cannot hold the tubing under pressure. It can also reduce a beneficial arcing spring effect.

Cold working can be used to increase hardness and strength of Type 316 austenitic stainless steel after annealing. However, work-hardening rates change with the steel's composition, and constituent percentages can vary within an allowable range. Cold working can also reduce corrosion resistance.

SUMMARY

The present invention provides a ferrule for a fitting that is characterized by at least three layers or regions having different hardnesses and strengths. In one embodiment, the ferrule has an outer shell, an intermediate layer, and a core. The outer layer can have corrosion-resistant properties, and may be very hard relative to the intermediate and core (e.g., a shell-like outer layer). The intermediate layer is below the outer layer. The thickness and hardness of the intermediate layer can vary according to the application or desired properties of the ferrule. The intermediate layer may have a hardness and strength between the very hard but thin outer layer and a soft (annealed) ferrule core.

Accordingly, the present invention includes a ferrule having an outer layer, a core, and an intermediate layer between the outer layer and the core. The intermediate layer has a hardness that is less than the hardness of the outer layer and greater than the hardness of the core. In one embodiment, the outer layer has a thickness of about 0.001-0.002 inches and the intermediate layer has a thickness between about 0.002-0.020 inches, however, thinner or thicker layers are possible.

The thickness of the intermediate layer may be equal or greater than 0.002, 0.003, 0.004, 0.005, 0.006, . . . , 0.019, 0.020, 0.021, . . . , 0.050 inch.

According to another aspect, the invention includes a method of forming a ferrule from a base material that has a first hardness. The method including hardening an outer layer of the ferrule such that the outer layer has a hardness that is greater than the first hardness and hardening an intermediate layer of the ferrule beneath the outer layer such that the intermediate layer has a hardness that is less than hardness of the outer layer and greater than the hardness of the base material.

The foregoing and other features of the invention are hereinafter described in greater detail with reference to the accompanying drawings.

BRIEF DESCRIPTION OF THE DRAWINGS

Embodiments of this invention will now be described in further detail with reference to the accompanying drawings, in which.

DETAILED DESCRIPTION

Figure 1:
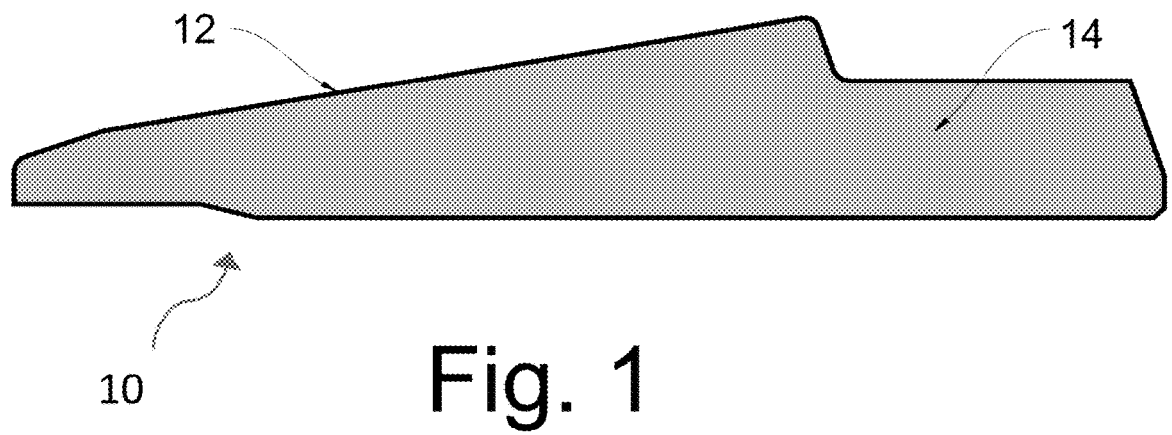
FIGS. 1-4 are exemplary cross-sectional views of traditionally hardened ferrules.
Figure 2:
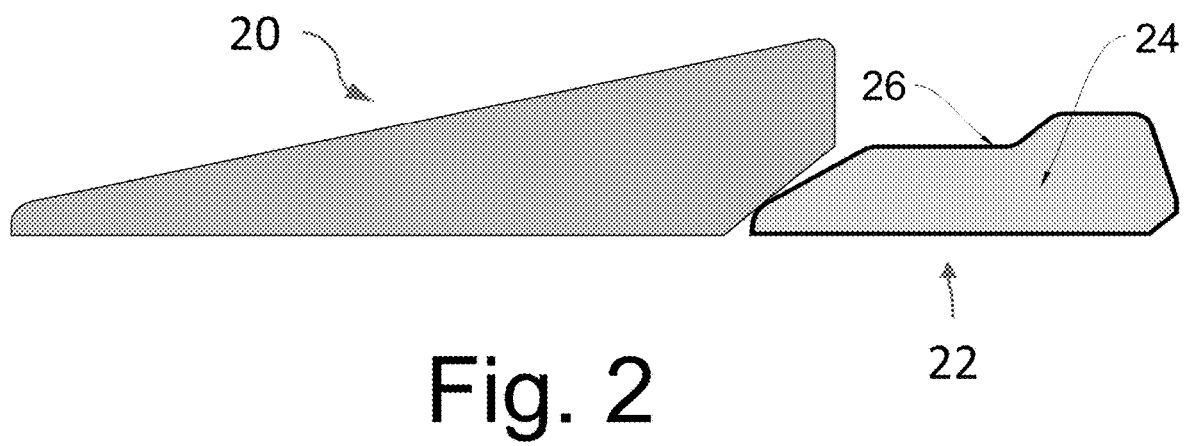
Figure 3:
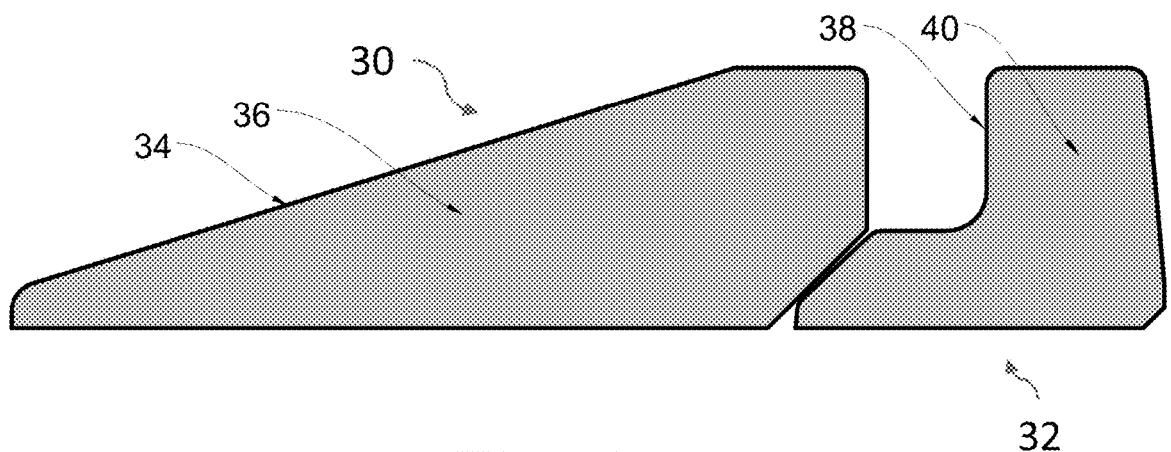
Figure 4:
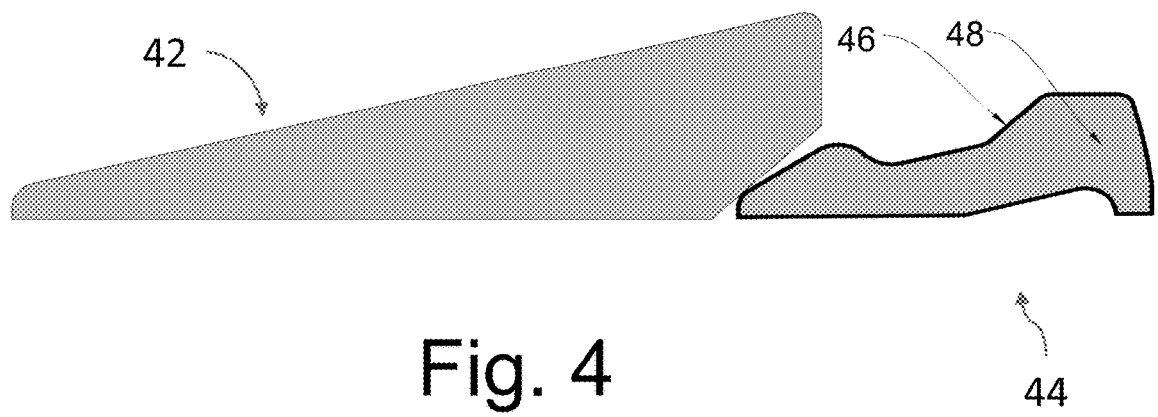

FIGS. 1-4 are cross-sectional views of traditionally hardened ferrules. FIG. 1 shows a single ferrule, FIG. 2 shows a double ferrule assembly, FIG. 3 shows a higher pressure double ferrule assembly. FIG. 4 shows a modified double ferrule arrangement.

In FIG. 1, the single ferrule 10 has a hardened outer or skin layer 12 surrounding an inner core layer (or simply core) 14 that has a hardness less than that of the outer layer.

In FIG. 2, a double ferrule assembly includes a front ferrule 20 and a back ferrule 22. The back ferrule 22 has an outer layer 24 surrounding a core 26. Again, the outer layer has a hardness greater than that of the core.

In FIG. 3, a higher pressure double ferrule assembly includes a front ferrule 30 and a back ferrule 32. The front ferrule has a hardened outer layer 34 encasing a softer core 36, and the back ferrule likewise has a hardened outer layer 38 surrounding a softer core 40.

In FIG. 4, another double ferrule assembly includes a front ferrule 42 and a back ferrule 44. Only the back ferrule has a hardened outer layer 46 encasing a softer inner core 48.

General ferrule strength for austenitic materials depends on the base ferrule material strength and hardness. In the foregoing ferrules, the entire ferrule core generally has similar hardness. These ferrules can be made from materials of various levels of cold work and hardness (generally from about 85 HRb to 30 HRc or more in some instances) to match ferrule strength to the tube size and hardness. Use of higher strength ferrule core materials can result in more complicated geometry (especially larger sizes) to control ferrule action and assembly torque.

Typically, the outer layer has a thickness of about 0.001 to 0.002 inches.

Figure 5:
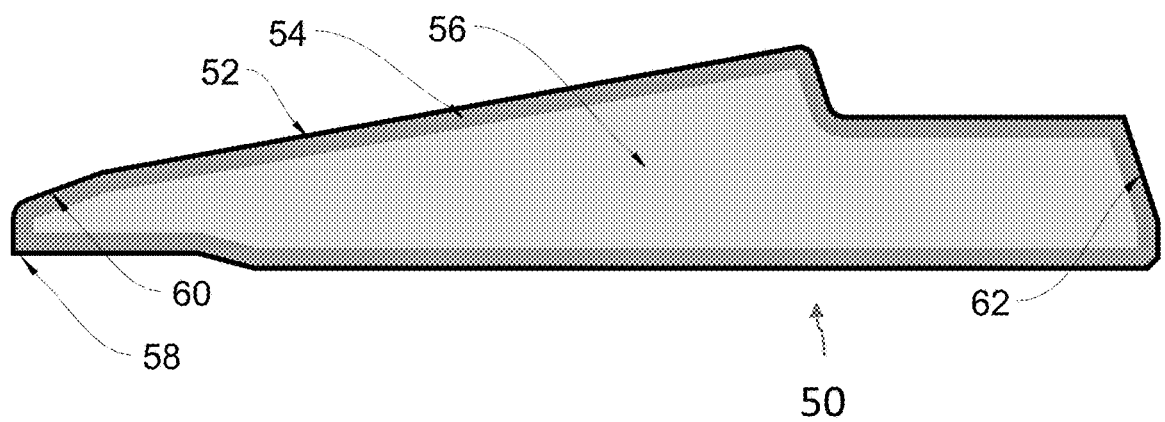
FIGS. 5-14 are exemplary cross-sectional views of various embodiments of ferrules having multiple layers of hardness in accordance with the invention.

Referring to FIG. 5, an exemplary ferrule according to the present invention is indicated generally by reference numeral 50. The ferrule, and also the other ferrules herein described, may be used in a conventional manner in a tube fitting for securing a tube in the fitting by compressing around the tube.

The ferrule 50 comprises an outer layer 52, an intermediate layer 54 below the outer layer, and a core 56 beneath the intermediate layer. That is, the intermediate layer is disposed between the outer layer and the core. The intermediate layer may be provided at particular regions, such as at the leading (biting) front edge 58 of the inner diameter surface, at the leading portion 60 of wedge/camming surface, and/or the back side 62 of the ferrule.

The intermediate layer has a hardness that is less than the hardness of the outer layer, and the core has a hardness that is less than the hardness of the intermediate portion. In other words, the intermediate layer may have a hardness that is greater than the hardness of the core, and may be thicker than the outer layer. The core may be the softest of the layers, and may be the thickest of the layers.

Although only three layers are shown, it should be appreciated that the ferrule may have more than three layers of hardness, preferably going from hardest to softest going inwardly from the outer surface.

The outer layer preferably has a thickness of about 0.001 to about 0.002 inches. The intermediate layer preferably has a thickness greater than the thickness of the outer layer, such as between about 0.002 to 0.020 inches. The core will typically be of much greater thickness than the intermediate layer.

The intermediate layer may be or relatively uniform hardness or may vary in hardness through its thickness.

The ferrule may be formed from a monolithic piece of material. The ferrule is treated to have multiple layers of hardness.

More particularly, the intermediate layer can vary in thickness from as thin as about 0.002 inches for some sizes and applications to more than about 0.020 inches for other sizes and applications. The intermediate layer has an intermediate strength and hardness between the hard outer skin and the soft core.

In one embodiment, the hardness of the intermediate layer may be between about 95 HRb and about 35 HRc, however, variations outside of this range are possible, such as greater than 80 HRb and less than 40 HRc.

The outer layer may have a hardness equal or greater than 40 HRc, 50 HRc, 60 HRc, 70 HRc, and higher.

The intermediate layer of hardness can be formed by any process that is capable of providing a corrosion resistant layer that can be varied considerably in thickness and is significantly stronger and harder than the soft core material.

For example, the intermediate layer can be formed by a surface treatment process, such as a gas infusion process.

Typical surface hardening methods produce a layer of varying hardness (usually harder on the outside and softer further from the surface) and the layer or region is significantly harder than the core material. The hardness of the intermediate layer may vary according to the depth of the layer. For example, the area of the intermediate layer adjacent to the outer layer may be harder than the area of the intermediate layer that is adjacent to the core.

The intermediate layer may be strengthened by any of several solution nitriding processes dating back to at least the early 1990's (for example EP 0652300 A1, which is hereby incorporated herein by reference) or the processes more recently described in US Published Application No. 2014/0048180, which is hereby incorporated herein by reference. This patent discloses a process that can be used to infuse nitrogen to depth greater than 0.002 inch and as deep as 0.020 inch, and even deeper, at a temperature that anneals the core. This infusion process strengthens the core material to form the intermediate layer. Initially, the monolithic piece of material can be cold worked. A related process that can be used is disclosed in International Application No. WO 2013/159781 A1, which is hereby incorporated by reference.

A ferrule having multiple layers of hardness can provide several improvements/benefits over current designs. The combined strength of the outer layer and the intermediate layer can allow the ferrule to be configured to have an overall strength that matches or is appropriate for the particular characteristics (e.g., size, material strength) of the tube on which the ferrule is installed.

The thickness and/or hardness of the intermediate layer may be adjusted to provide additional support for the hard, relatively thin outer layer that is in contact with the tube. For example, a thicker and/or harder intermediate layer may be used for large diameter tube, heavy walled tube, or relatively hard tube. Customizing the outer layer and intermediate layer in this manner (e.g., so that it is configured for the tube on which the fitting is installed) can improve grip/seal of the ferrule on stronger and harder tube materials.

The intermediate layer and/or the adjustment of the thickness or hardness of the intermediate layer also can provide additional support at the ferrule bearing and sealing surfaces to better control of ferrule deformation and assembly torque. The intermediate layer and/or the adjustment of the thickness of the intermediate layer can also maintain a soft ferrule core, which can be beneficial for controlling ferrule deformation and assembly torque when pulling up a fitting.

The thickness and hardness of the intermediate layer can be increased or decreased based upon the desired effect.

The intermediate layer also can be a corrosion-resistant layer. The intermediate layer therefore can increase the overall corrosion resistance of the ferrule by providing a relatively thick layer of corrosion resistance. This can provide additional corrosion protection in sever service applications.

Additionally or alternatively, the intermediate layer can allow for the use of a soft/annealed core with additional corrosion benefits in applications like stress corrosion cracking where material hardness is often limited.

This intermediate layer can be varied in thickness in the range of about 0.002" to more than about 0.020" while maintaining an outer skin hardness greater than about 50 HRc. In particular, the thickness of the intermediate layer may be equal or greater than 0.002, 0.003, 0.004, 0.005, 0.006, . . . , 0.019, 0.020, 0.021, . . . , 0.050 inch.

The ferrule may also include multiple intermediate layers having varying thicknesses in this range.

A ferrule having multiple hardness layers can be particularly applicable for ferrules made from austenitic materials, including but not limited to, 300 series stainless steels, Molybdenum enhanced alloys (e.g., 6 Mo, etc.), Inconel, Hastelloy, etc. The multiple layer of hardness also can be used with other ferrule and material designs to form a ferrule that is layer hardened in a corrosion resistant manner. Some examples could include nickel alloys and copper nickel alloys.

Figure 6:
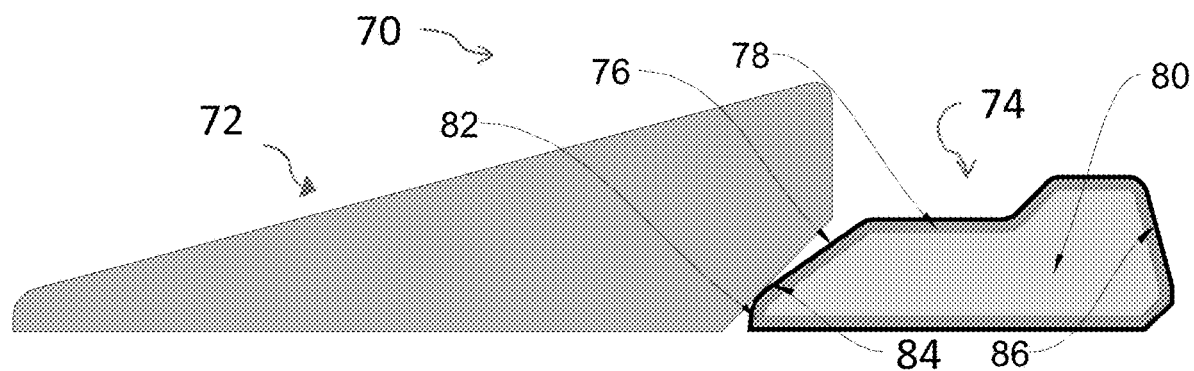

Referring to FIG. 6, an assembly 70 of a front ferrule 72 and a rear ferrule 74 is shown. The rear ferrule 74 can have multiple layers of hardness, including a core 80, an intermediate layer 78 of a different hardness, and an outer layer 76 of another hardness, similar to the layers described above with respect to FIG. 5. The three layers can be provided at least at the front edge 82, the wedge/camming surface 84 and/or the back side 86.

Figure 7:
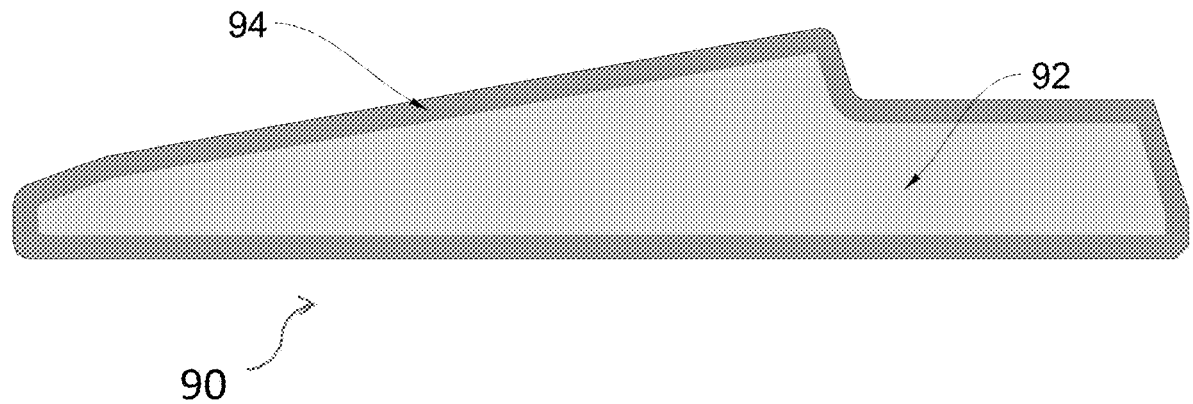

A thicker corrosion resistant layer may be used without the hard/thin outer layer to improve performance of ferrules not required to penetrate the outer tubing skin (compression ferrules, front ferrules and other alloy ferrules). An embodiment of this ferrule 90 is shown in FIG. 7. The ferrule 90 includes a core 92 and a single and harder corrosion resistant layer 94 which forms the outer surface of the ferrule. The core 92 can be a soft/annealed core and layer 94 may be a strong/thick, intermediate hardness outer surface for compressing and sealing against a tube. The layer 94 can be varied in thickness in the ranges above described in relation to the intermediate layers of the earlier embodiments. Benefits of such a design over a ferrule with a uniformly soft/annealed core include improved combination of ferrule flexibility and tube compression, increased ferrule strength, a soft core to maintain low assembly torque, and improved corrosion resistance, especially in stress corrosion cracking and similar applications.

Figure 8:
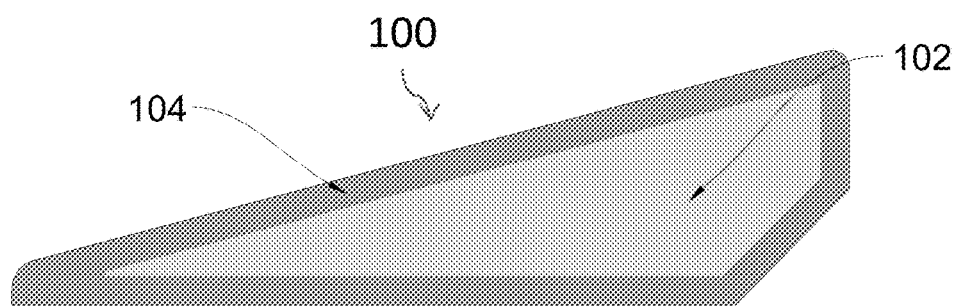

FIG. 8 shows a front ferrule 100 of a two ferrule assembly that includes a core 102 and a single corrosion resistant layer 104 which forms the outer layer of the ferrule.

Figure 9:
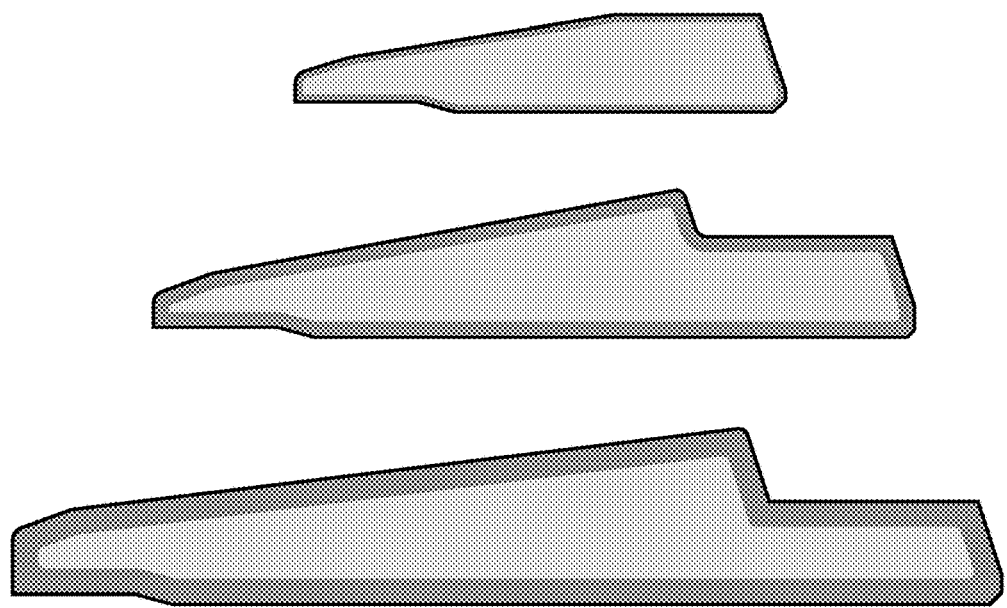

FIG. 9 show various geometries of single ferrules that have the previously described three layer construction.

Figure 10:
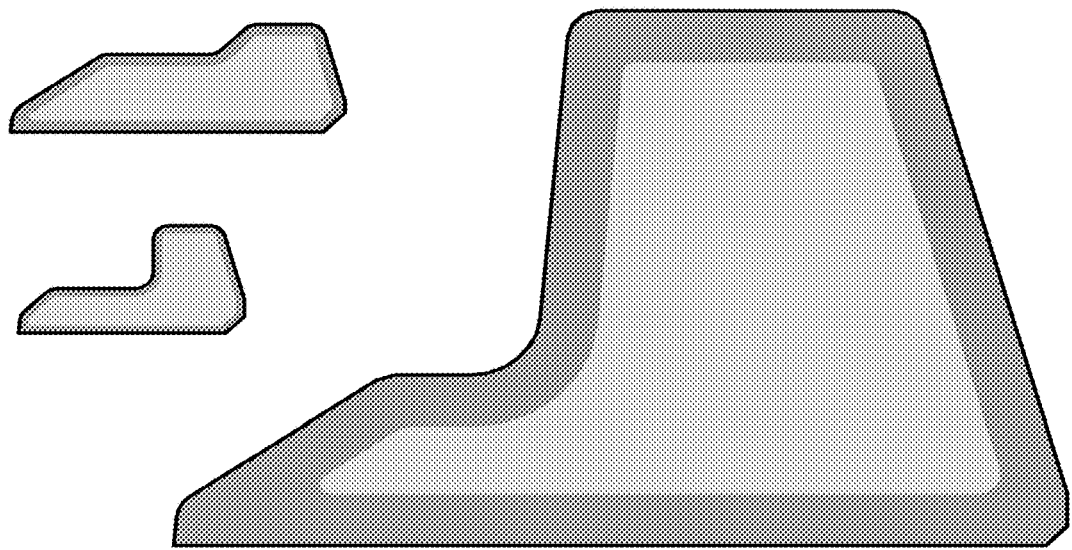

FIG. 10 shows various embodiments of rear ferrules of a two ferrule fitting assembly. Each ferrule has a core, an intermediate layer of a hardness greater than the hardness of the core, and an outer layer of a hardness greater than the hardness of the intermediate layer. The range of thicknesses and hardnesses may be as previously described for the three layer construction.

Ferrules may also be selectively hardened. That is, an intermediate and/or hard/thin layer need not fully encase the core, but rather can be provided at selected regions of the ferrule.

Figure 11:
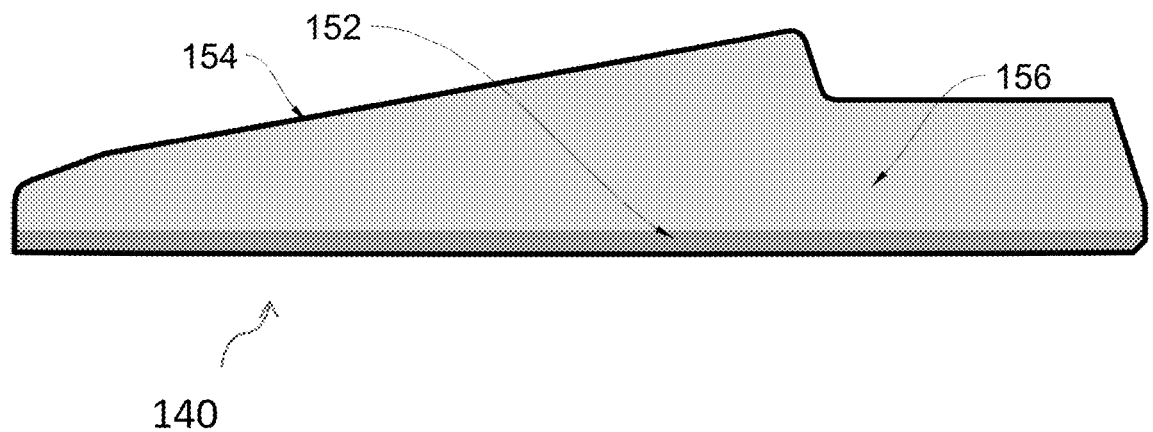
Figure 12:
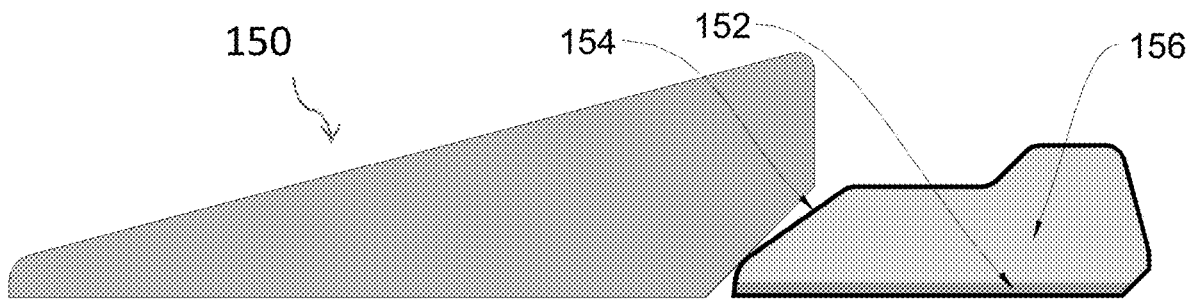

FIGS. 11 and 12 show ferrules 140 and 150 that are selectively layered/strengthened by mechanical cold work at the inner diameter of the ferrule and then hardened all over. In particular, in the ferrules 140 and 150 an intermediate layer 152 can be provided only at the inner diameter of the ferrule between the harder and thinner outer layer 154 and the softer core 156, while rest of the ferrule is provided only with the outer layer and the softer core. This provides most of the additional strength in line with the ferrule holding the tube. The thicknesses and hardnesses of these layers can be as above described in relation to the other embodiments.

Figure 13:
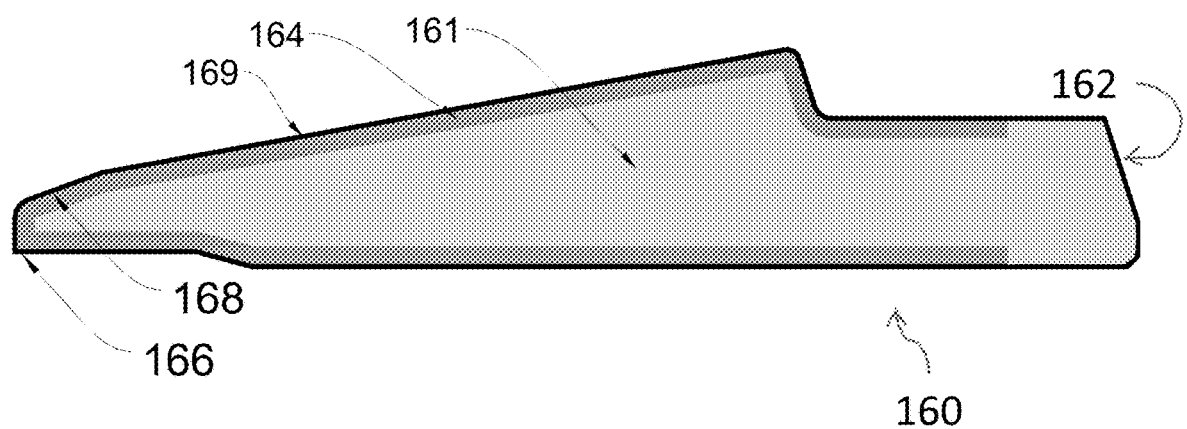
Figure 14:
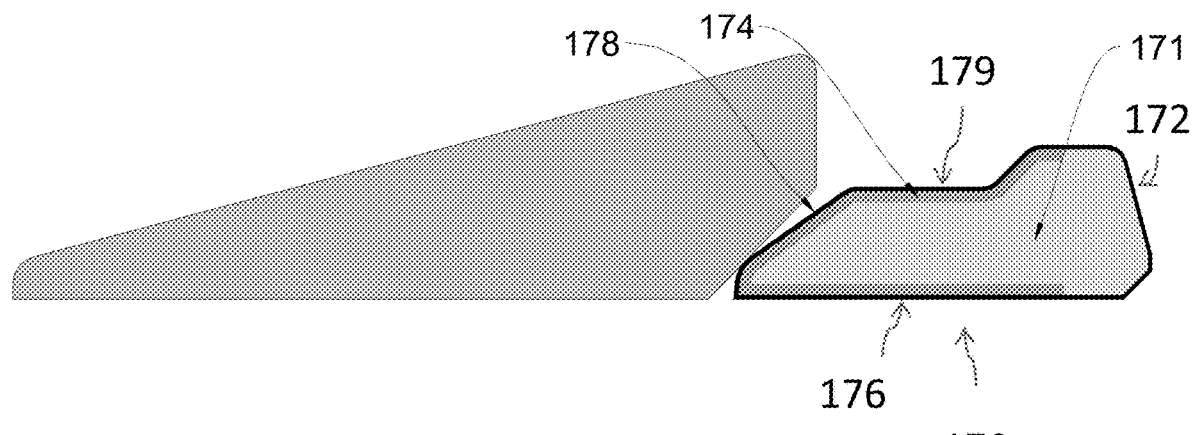

In addition, selective mechanical hardening can be done as an additional option to other multilayer hardened ferrules to provide more selective ferrule strength and increase tube holding and control torque. FIGS. 13 and 14 show ferrules 160 and 170 selectively hardened, for example, by masking a portion of the ferrule core 161, 171, such as the back 162, 172 of the ferrule 160, 170 that will contact with the nut of the fitting assembly, so that the intermediate layer 164, 174 is not formed on the back region 162, 172 of the ferrule but formed elsewhere, in particular at the inner diameter surface 166, 176 and the wedge/camming surface 168, 178 of the ferrule. This also can be done by selectively plating/masking a portion of the ferrule at appropriate times to prevent the hardening processes from hardening the ferrule at the masked regions covered by the plating. The outer, very hard layer 169, 179 can also be selectively provided as desired.

As above discussed, the intermediate layer may be strengthened by any of several solution nitriding processes, In particular, a heat treatment for forming an austenitic intermediate layer with ≥0.30 wt. % of dissolved nitrogen in shaped parts made of steel, in particular stainless or ferritic steel, more particularly martensitic steel or stainless ferritic-austenitic steel or stainless ferritic-martensitic steel, is effected by nitriding at a temperature between 1000 and 1200° C. in a nitrogen-containing gas atmosphere and subsequent cooling at a rate such that avoids nitrite excretion.

The intermediate layer may be hardened by subsequent re-heating to a temperature ≤650° C.

The intermediate layer may also be strengthened by, using a method for formation of expanded austenite and/or expanded martensite, by solution hardening of a cold deformed workpiece of a passive alloy, which method comprises a first step of dissolving at least nitrogen in the workpiece at a temperature T1, which is higher than the solubility temperature for carbide and/or nitride and lower than the melting point of the passive alloy, and a subsequent second step of dissolving nitrogen and/or carbon in the workpiece at a temperature T2, which is lower than the temperature at which carbides and/or nitrides form in the passive alloy.

The first step of dissolving nitrogen in the workpiece at a temperature higher than the solubility temperature for nitride significantly improves the core strength of the passive alloy, such as stainless steel, in comparison to only re-crystallization annealing of the material prior to low temperature hardening.

The high temperature dissolution of nitrogen may be done at temperatures above the austenisation temperature of the alloy, e.g. at least or above 1050° C. and below the melting point of the alloy. The strengthening effect of this high-temperature nitriding is sufficient to compensate for the loss of strength caused by annihilating the cold deformation while the workpiece is kept at the high temperature during nitriding. Furthermore, the high-temperature nitriding allows that low temperature hardening can be performed at higher temperatures than usual without creating problems with formation of nitrides and/or carbides, and that it is easier to activate the passive surface on the material at the subsequent low temperature surface hardening process. Thus, the formation of the hardened zone is accelerated. Furthermore, better corrosion characteristics are obtained, since nitrogen exists in solid solution.

A significant improvement of the hardening of passive alloys can be obtained by the high temperature dissolution of nitrogen followed by low temperature nitriding, carburising or nitrocarburising. Any passive alloy in which expanded austenite or expanded martensite may form is relevant, such as stainless steel, in particular cold deformed austenitic stainless steel.

The subsequent low temperature dissolution of nitrogen and/or carbon, which takes place at temperatures below the temperature at which carbides and/or nitrides form in the passive alloy, such as below 450-550° C. dependent on the process, may in the subsequent second step be carried out on a material, which does not contain plastic deformation, but which has a strength on level with a plastically deformed workpiece. This means that the risk of sensitization is reduced significantly. The presence of nitrogen and optionally carbon in solid solution in stainless steel have even been found to give a faster low temperature process, than can be obtained using methods of the prior art, since the diffusion coefficients of nitrogen and carbon increase with increasing carbon/nitrogen content. Thus, in certain examples the passive alloy is a stainless steel containing nitrogen and/or carbon.

Thus it is possible to carry out a low temperature hardening of passive materials, and in particular stainless steel, of even strongly cold deformed components without occurrence of sensitization of the material and without loss of strength. Cold deformed material thus treated may even obtain a significantly better corrosion resistance than untreated material.

Dissolution at temperature T1 and at temperature T2 may be performed using any appropriate technology. For example, dissolution at temperature T1 and at temperature T2 may be performed in a gaseous process, e.g. using a gas containing nitrogen, such as ammonia, particularly $N_2$. Dissolution may also be performed using ion implantation, salt bath or plasma.

Dissolution at temperature T1 and temperature T2 may be carried out using gas, since this is a cheap and efficient solution and because all types of geometries may be treated uniformly, and there is a good temperature uniformity. Moreover, the use of a gas process means that the process is within the framework of the laws of thermodynamics, which means that there are very well controlled processing conditions.

The low temperature process may be carried out immediately after the high temperature process, but this is not mandatory.

It is also possible to perform the two processes with an offset in time and place.

If the processes are carried out immediately after each other, e.g. with a cooling step between the first and the second dissolution step, it is possible to avoid that a passivation of the surface occurs and hence activation prior to the low temperature process is superfluous. Thus, the dissolution at temperature T2 may take place immediately after cooling from temperature T1 without the passivation/activation of the surface in-between the execution of the high temperature process and the low temperature process.

This may be done in the same furnace.

When using gas the relevant gases containing nitrogen and/or carbon for use in the low temperature process may be supplied immediately when the material is cooled to temperature T2.

The cooling may be advantageously done using argon without any nitrogen present during cooling.

The method may further comprise an intermediate step of cooling the workpiece after the dissolution step at temperature T1 to a temperature which is lower than the temperature at which carbides and/or nitrides form in the passive alloy, and in a specific example of the invention dissolution at temperature T2 takes place immediately after cooling from dissolution at temperature T1 without the occurrence of a passivation of the surface.

By example, cooling after the first dissolution process at temperature T1 may take place especially quickly, e.g. in a period of no more than 60 second, in the temperature interval in which there is the largest tendency for sensitisation and formation of precipitations, such as nitrides and/or carbides, for the relevant alloy. For stainless steel it has been found that this in particular takes place in the interval from 900 to 700° C. where the material should be cooled quickly.

In one embodiment the workpiece is cooled from 900 to 700° C. in less than 60 seconds.

In another embodiment the workpiece is cooled from 900 to 700° C. in less than 30 seconds. Thereby the formation of carbides and/or nitrides is substantially avoided, and this is an advantage since these can react with the alloying elements in stainless steel, such as chromium. The depletion of alloying elements from solid solution and binding of these as nitrides and/or carbides is suppressed and the corrosion resistance characteristics are maintained.

In a particular example the first dissolution step is performed in a gas, such as a gas containing $N_2$, e.g. substantially pure $N_2$ without other gasses than unavoidable impurities, and the cooling step may also be performed in a gas, which may be the same gas as that used in the first dissolution step.

The gas in the cooling step may be an inert gas not containing nitrogen (an nitrogen-free inert gas) such as argon. An "inert gas" is a gas that does not contain any substantial amount of molecules which interact with elements of the alloy; any inert gas not containing nitrogen is contemplated, or mixtures of gasses.

Cooling in an nitrogen-free inert gas may allow longer cooling times than 60 s, but cooling may be performed in a nitrogen-free inert gas in less than 30 s, such as in less than 10 s.

A method for solution hardening of a cold deformed workpiece of a passive alloy to form the intermediate layer, can comprise the steps of:

dissolving at least nitrogen in the workpiece at a temperature T1, which is higher than the austenisation temperature and lower than the melting point of the passive alloy, and cooling the workpiece after the dissolution step to a temperature which is lower than the temperature at which carbides and/or nitrides form in the passive alloy, wherein the cooling step takes place in an inert gas not containing nitrogen.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. A ferrule for a tube fitting, comprising:
    an outer layer having a hardness equal or greater than 40 HRc, the outer layer having a thickness of about 0.001 to about 0.002 inches;
    an intermediate layer below the outer layer, the intermediate layer having a hardness that is less than the hardness of the outer layer and in the range of 80 HRb to 40 HRc, and the intermediate layer having a thickness equal or greater than 0.003 inches; and
    a core below the intermediate layer, the core having a hardness that is less than the hardness of the intermediate layer.

2. The ferrule of claim 1, wherein the intermediate layer has a thickness no greater than about 0.020 inches.

3. The ferrule of claim 1, wherein the intermediate layer includes varying levels of hardness.

4. The ferrule of claim 1, wherein the ferrule is made of an austenitic material.

5. The ferrule of claim 1, wherein the thickness of the intermediate layer is equal or greater than 0.020 inch.

6. The ferrule of claim 1, wherein the outer layer has a hardness equal or greater than 50 HRc.

7. The ferrule of claim 1, wherein the intermediate layer has a hardness in the range of 95 HRb to 35 HRc.

8. The ferrule of claim 1, wherein the intermediate layer and/or outer layer are not provided at some regions of the outer surface of the ferrule.

9. The ferrule of claim 1, wherein the intermediate layer is formed by nitrogen infusion.

10. The ferrule of claim 1, wherein the intermediate layer or core is hardened by dissolving at least nitrogen in the workpiece at a temperature T1, which is higher than the austenisation temperature and lower than the melting point of the passive alloy, and cooling the workpiece after the dissolution step to a temperature which is lower than the temperature at which carbides and/or nitrides form in the passive alloy.

11. The ferrule of claim 1, wherein the outer layer is one of a carburized layer or a nitrided layer.

12. The ferrule of claim 11, wherein the outer layer is the carburized layer.

13. A method of forming a tube fitting ferrule from a base material that has a first hardness, the method comprising:
    hardening an outer layer of the ferrule such that the outer layer has a hardness that is greater than the first hardness, wherein the hardness of the outer layer is equal or greater than 40 HRc, and the outer layer has a thickness of about 0.001 to about 0.002 inches;
    hardening an intermediate layer of the ferrule beneath the outer layer such that the intermediate layer has a hardness that is less than the hardness of the outer layer and greater than the hardness of the base material of the ferrule and in the range of 80 HRb to 40 HRc, and the intermediate layer having a thickness equal or greater than 0.003 inches.

14. The method of claim 13, wherein the intermediate layer is hardened by nitrogen infusion.

15. The method of claim 13, wherein the outer layer and/or intermediate layer are formed at selected regions of the ferrule.

16. The method of claim 13, wherein the base material is an austenitic material.

17. The method of claim 13, wherein the intermediate layer or a core of the ferrule is hardened by dissolving at least nitrogen in the workpiece at a temperature T1, which is higher than the austenisation temperature and lower than the melting point of the passive alloy, and cooling the workpiece after the dissolution step to a temperature which is lower than the temperature at which carbides and/or nitrides form in the passive alloy.

18. The method of claim 17, wherein the cooling step takes place in an inert gas not containing nitrogen.

19. The method of claim 13, wherein the outer layer is one of a carburized layer or a nitrided layer.

* * * * *